US 11,794,043 B2

(12) United States Patent
Luo et al.

(10) Patent No.: US 11,794,043 B2
(45) Date of Patent: Oct. 24, 2023

(54) CEILING FIXTURE FIRESTOP (71) Applicant: URSATECH LTD., Barrie (CA)

(72) Inventors: Xiaoxiong Luo, Barrie (CA); John B. Page, Barrie (CA)

(73) Assignee: URSATECH LTD., Barrie (CA)

(*) Notice: Subject to any disclaimer, the term of this patent is extended or adjusted under 35 U.S.C. 154(b) by 531 days.

(21) Appl. No.: 16/709,365

(22) Filed: Dec. 10, 2019

(65) Prior Publication Data
US 2021/0170209 A1 Jun. 10, 2021

(51) Int. Cl.
A62C 2/06 (2006.01)
E04B 9/00 (2006.01)
F16L 5/04 (2006.01)
F21S 8/02 (2006.01)
F21V 25/12 (2006.01)
F21S 8/04 (2006.01)

(52) U.S. Cl.
CPC .............. A62C 2/065 (2013.01); E04B 9/006 (2013.01); F16L 5/04 (2013.01); F21S 8/026 (2013.01); F21S 8/04 (2013.01); F21V 25/125 (2013.01)

(58) Field of Classification Search
CPC . A62C 2/065; A62C 3/16; E04B 9/006; F16L 5/04; F21S 8/026; F21S 8/04; F21S 8/02; F21V 25/125; F21V 15/01
USPC ....... 362/364, 267, 365, 147, 294, 362, 366, 362/373; 52/232
See application file for complete search history.

(56) References Cited

U.S. PATENT DOCUMENTS

| 3,955,330 | A | 5/1976 | Wendt |
| 4,137,376 | A | 1/1979 | Clegg et al. |
| 4,364,210 | A | 12/1982 | Fleming et al. |
| 4,513,173 | A | 4/1985 | Merry |
| 4,630,415 | A | 12/1986 | Attwell |
| 4,754,377 | A | 6/1988 | Wenman |
| 4,888,925 | A | 12/1989 | Harbeke |
| 4,916,800 | A | 4/1990 | Harbeke |
| 5,058,341 | A | 10/1991 | Harbeke, Jr. |

(Continued)

FOREIGN PATENT DOCUMENTS

| CA | 2786202 A1 | 3/2013 |
| CN | 101656304 B | 9/2011 |

(Continued)

OTHER PUBLICATIONS

ENIA (Energy Networks & Industrial Applications), "Fire stop barriers FIRE-Stop", retrieved Dec. 10, 2013 at: http://www.enia.gr/wp-content/uploads/2012/07/FireBarriersRaytechCatal_SIGGR.pdf, (7 pages).

(Continued)

Primary Examiner — Brent W Herring (57) ABSTRACT

A system for use with a ceiling fixture, a portion of which projects though an opening in a ceiling wall, for assisting in preventing spread of fire through the opening. The system has a metal collar for lining the opening. The metal collar has an upper rim overlying a top surface of the ceiling wall at the opening, a middle section facing an inner edge of the ceiling wall at the opening and a lower rim underlying a bottom surface of the ceiling wall at the opening. The system also has an intumescent ring for surrounding the projecting portion of the fixture so as to be interposed between the metal collar and the projecting portion of the fixture.

19 Claims, 11 Drawing Sheets (56) References Cited

U.S. PATENT DOCUMENTS

| | | | |
|---|---|---|---|
| 5,129,201 A | 7/1992 | Robertson et al. | |
| 5,174,077 A | 12/1992 | Murota | |
| 5,301,475 A | 4/1994 | Stefely | |
| 5,417,019 A | 5/1995 | Marshall et al. | |
| 5,452,551 A | 9/1995 | Charland et al. | |
| 5,887,395 A | 3/1999 | Navarro et al. | |
| 5,950,376 A | 9/1999 | Kemeny et al. | |
| 5,961,154 A * | 10/1999 | Williams | F16L 13/10 |
| | | | 156/92 |
| 6,105,334 A | 8/2000 | Monson et al. | |
| 6,176,052 B1 | 1/2001 | Takahashi | |
| 6,305,133 B1 | 10/2001 | Cornwall | |
| 6,336,297 B1 | 1/2002 | Cornwall | |
| 6,412,243 B1 | 7/2002 | Sutelan | |
| 6,645,278 B2 | 11/2003 | Langille et al. | |
| 6,694,684 B2 | 2/2004 | Radke et al. | |
| 6,725,615 B1 | 4/2004 | Porter | |
| 6,747,074 B1 | 6/2004 | Buckingham et al. | |
| 6,790,893 B2 | 9/2004 | Nguyen et al. | |
| 7,080,486 B2 | 7/2006 | Radke et al. | |
| 7,397,219 B2 | 7/2008 | Phillips et al. | |
| 7,465,888 B2 | 12/2008 | Fischer et al. | |
| 7,470,048 B2 | 12/2008 | Wu | |
| 7,476,010 B2 | 1/2009 | Johnson | |
| 7,486,047 B2 | 2/2009 | Phillips et al. | |
| 7,651,238 B2 | 1/2010 | O'Brien | |
| 7,651,248 B2 | 1/2010 | Hua | |
| 7,670,033 B2 | 3/2010 | Steer et al. | |
| 7,812,253 B2 | 10/2010 | Moselle | |
| 7,913,468 B2 | 3/2011 | Spais | |
| 7,954,974 B2 | 6/2011 | Johnson | |
| 8,146,305 B2 | 4/2012 | Cordts | |
| 8,263,254 B2 | 9/2012 | Mehta et al. | |
| 8,277,965 B2 | 10/2012 | Hermann et al. | |
| 8,367,233 B2 | 2/2013 | Hermann et al. | |
| 8,393,121 B2 | 2/2013 | Beele | |
| 8,397,452 B2 | 3/2013 | Stahl, Sr. et al. | |
| 9,089,716 B2 | 7/2015 | Peterson et al. | |
| 9,089,726 B1 * | 7/2015 | Luo | E04B 1/948 |
| 9,797,563 B2 | 10/2017 | Luo et al. | |
| 9,803,845 B2 | 10/2017 | Luo et al. | |
| 10,551,016 B2 | 2/2020 | Luo et al. | |
| 10,704,751 B2 | 7/2020 | Luo et al. | |
| 11,015,785 B1 * | 5/2021 | Schubert | F21V 15/01 |
| 2002/0155348 A1 | 10/2002 | Gitto | |
| 2004/0016190 A1 | 1/2004 | Radke et al. | |
| 2004/0100040 A1 | 5/2004 | Sakno | |
| 2004/0168398 A1 | 9/2004 | Sakno et al. | |
| 2005/0170238 A1 | 8/2005 | Abu-Isa et al. | |
| 2006/0096207 A1 | 5/2006 | Spais | |
| 2006/0234119 A1 | 10/2006 | Kruger et al. | |
| 2007/0206374 A1 * | 9/2007 | Petrakis | F21S 8/02 |
| | | | 362/147 |
| 2008/0011383 A1 | 1/2008 | Paetow et al. | |
| 2009/0161370 A1 | 6/2009 | Johnson | |
| 2009/0218130 A1 | 9/2009 | Monden et al. | |
| 2010/0024338 A1 * | 2/2010 | Cordts | E04G 15/063 |
| | | | 52/745.05 |
| 2010/0136391 A1 | 6/2010 | Prilutsky et al. | |
| 2010/0136404 A1 | 6/2010 | Hermann et al. | |
| 2010/0214790 A1 * | 8/2010 | Wu | F21V 25/12 |
| | | | 362/364 |
| 2011/0064997 A1 | 3/2011 | Peskar et al. | |
| 2011/0088342 A1 | 4/2011 | Stahl, Sr. et al. | |
| 2011/0262783 A1 | 10/2011 | Mehta | |
| 2011/0281154 A1 | 11/2011 | Vissers et al. | |
| 2012/0022201 A1 | 1/2012 | Zhvanetskiy et al. | |
| 2012/0034501 A1 | 2/2012 | Hermann et al. | |
| 2012/0231318 A1 | 9/2012 | Buck et al. | |
| 2012/0233943 A1 | 9/2012 | Monden et al. | |
| 2012/0304979 A1 | 12/2012 | Munzenberger et al. | |
| 2013/0061545 A1 | 3/2013 | Van Walraven et al. | |
| 2013/0086857 A1 | 4/2013 | Paetow et al. | |
| 2013/0104474 A1 | 5/2013 | Klein | |
| 2013/0118102 A1 | 5/2013 | Pilz et al. | |
| 2013/0143076 A1 | 6/2013 | Sachdev et al. | |
| 2013/0247487 A1 | 9/2013 | Turner | |
| 2014/0077043 A1 | 3/2014 | Foerg | |
| 2015/0345758 A1 * | 12/2015 | Highbridge | F21V 15/01 |
| | | | 362/369 |
| 2016/0146411 A1 * | 5/2016 | Luo | F21V 29/70 |
| | | | 362/364 |
| 2016/0146446 A1 * | 5/2016 | Luo | F21S 8/026 |
| | | | 362/365 |
| 2016/0209018 A1 * | 7/2016 | Johnson | F21S 8/026 |
| 2016/0238225 A1 | 8/2016 | Rashidi Doust | |
| 2016/0238226 A1 * | 8/2016 | Rashidi Doust | F21V 21/047 |
| 2021/0025556 A1 | 1/2021 | Luo et al. | |

FOREIGN PATENT DOCUMENTS

| | | | |
|---|---|---|---|
| DE | 19934902 A1 | 1/2000 | |
| DE | 202012003405 U1 | 8/2013 | |
| DE | 102013203173 A1 | 10/2013 | |
| EP | 0635665 B1 | 3/1997 | |
| EP | 1273841 A1 | 1/2003 | |
| EP | 2180240 A1 * | 4/2010 | F21S 8/02 |
| EP | 2572760 A2 | 3/2013 | |
| GB | 2077382 A | 12/1981 | |
| GB | 2108614 A | 5/1983 | |
| GB | 2334770 A * | 9/1999 | A62C 2/065 |
| GB | 2422191 A | 7/2006 | |
| GB | 2436139 A | 9/2007 | |
| GB | 2453950 A * | 4/2009 | A62C 2/065 |
| GB | 2459538 A | 11/2009 | |
| GB | 2471929 A | 1/2011 | |
| GB | 2495009 A | 3/2013 | |
| GB | 2515649 A | 12/2014 | |
| GB | 2517222 A | 2/2015 | |
| KR | 10-2007-0023293 | 2/2007 | |
| WO | WO-9704838 A1 * | 2/1997 | A62C 2/065 |
| WO | 2011/124886 A2 | 10/2011 | |
| WO | 2012/080758 A2 | 6/2012 | |
| WO | 2013/045937 A2 | 4/2013 | |
| WO | 2013/145790 A1 | 10/2013 | |
| WO | 2014/013265 A1 | 1/2014 | |
| WO | WO-2020167127 A1 * | 8/2020 | A62C 2/12 |

OTHER PUBLICATIONS

Fischer Fixing Systems, "Fischer Conduit intumescent—FCi", retrieved Dec. 10, 2013 at: https://www.byko.is/media/fischer/15_-_fischer_Conduit_Intumescent.pdf, (1 page).

Proquest Dialog, Flame Retardancy News 14.11 (Nov. 2004), "Great Lakes Intros New Intumescents", retrieved from web page: http://search.proquest.com/professional/docview/671320957/141D2914C631D147EDD/6 . . . ; Nov. 18, 2013 (2 pages).

ISE Fire Products & Services Ltd., "Intumescent Fire Protection Products", 2013, retrieved Sep. 26, 2013 at: http://www.isefireproducts.co.uk/intumescent-products, (2 pages).

Kidde Fire Protection Services, "Intumescent Fire Seals Product Range", retrieved Sep. 26, 2013 at: http://www.kiddefps.com/utcfs/wS-407/Assets/Intumescent%20Fire%20Seals.pdf, (31 pages).

Machine-generated English translation by EPO and Google, Description DE19934902, Haupt, Gabriele, "The invention relates to a foreclosure of pipes, cables and ducts through walls or ceilings, as well as joints, columns and wall openings", Jan. 27, 2000 (7 pages).

Machine-generated English translation by EPO and Google, Description of DE102013203173, Chikatimalla, Rajesh, "The invention relates to a wrapping tape for the fire-resistant sealing of pipe passages, with a first and an opposite second side having an intumescent material under heat", Oct. 10, 2013 (29 pages).

Machine-generated English translation by EPO and Google, Description of DE202012003405, DOYMA GMBH & Co., "The invention relates to a wrapping tape for the fire-resistant sealing of pipe passages, with a first and an opposite second side having an intumescent material under heat", Aug. 29, 2013 (33 pages).

Machine-generated English translation by EPO and Google, Description of EP1273841, Züll, Armin, "The invention relates to a fire sleeve", Jan. 8, 2002 (11 pages).

(56) References Cited

OTHER PUBLICATIONS

Tremco Illbruck Coating Ltd., "B600 Intumescent Pipe Sleeve", Jun. 2010, retrieved Dec. 10, 2013 at: http://www.nullifirefirestopping.co.uk/celumdb/documents/Nullifire_B600_DS_GB_19530.pdf, (4 pages).
Pemko Manufacturing Co., Inc., "Adhesive Gasketing (AG): Adhesive-Backed Fire/Smoke Gasketing", retrieved Sep. 26, 2013 at:http://www.pemko.com/index.cfm?event=products.productListing&searchName=Search+by+Pemko+Product+Number&openFilter=loadPemkoPartNumberSearch&partNumber=s773&partCategoryIds=S773D%3A895, (6 pages).
PFC Corofil, "PFC Corofil Intemescent Conduit", retrieved Dec. 10, 2013 at: http://www.pfc-corofil.com/sites/default/files/products/downloads/pfc_corofil_intumescent_conduit.pdf, (1 page).
The Sparks Direct Blog, "Aurora Fire Rated Downlights: How are they tested and how do they work?", retrieved Sep. 26, 2013 at: http://blog.sparksdirect.co.uk/tag/building-regulations/, (8 pages).
Tesla Motors Club, "Amazing Core Tesla Battery IP—18650 Cell" retrieved from web page: http://www.teslamotorsclub.com/showthread.php/17456-Amazing-Core-Tesla Battery-IP . . . ; Nov. 18, 2013 (10 pages).
Trademark Hardware, "Adhesive Weatherstrip, 5/16" Wide Silicone and Intumescent Fin", retrieved at Sep. 26, 2013 at: http://www.tmhardware.com/Adhesive-Weatherstrip-Gasketing-Intumescent-Fin.html, (2pages).
International Search Report dated Dec. 9, 2015, issued in the corresponding International Application No. PCT/CA2015/051171.
Written Opinion dated Dec. 9, 2015, issued in the corresponding International Application No. PCT/CA2015/051171.
Notice of Allowance dated Mar. 31, 2022, issued in the related U.S. Appl. No. 16/893,088.

\* cited by examiner

FIG. 15

# CEILING FIXTURE FIRESTOP

BACKGROUND

This relates to a firestop system for use with a ceiling fixture, such as a downlight, and to a ceiling fixture and associated firestop system.

When a fire breaks out in a building, it should be contained as much as possible. While a ceiling in a building may be designed to impede the spread of fire, openings through the ceiling accommodating fixtures present an opportunity for a fire to spread more easily. Also, some ceiling fixtures themselves, such as downlights, can be the cause of a fire.

Therefore, there is a need for an approach to reduce the fire hazards associated with ceiling fixtures.

SUMMARY

In accordance with an embodiment, there is provided a system for use with a ceiling fixture, a portion of which projects though an opening in a ceiling wall, for assisting in preventing spread of fire through the opening. The system has a metal collar for lining the opening. The metal collar has an upper rim overlying a top surface of the ceiling wall at the opening, a middle section facing an inner edge of the ceiling wall at the opening and a lower rim underlying a bottom surface of the ceiling wall at the opening. The system also has an intumescent ring for surrounding the projecting portion of the fixture so as to be interposed between the metal collar and the projecting portion of the fixture.

In an aspect, there is provided a system for use with a ceiling fixture, a portion of which projects though an opening in a ceiling wall, for assisting in preventing spread of fire through said opening, said system comprising: a metal collar for lining said opening, said metal collar having an upper rim for overlying a top surface of said ceiling wall at said opening, a middle section for facing an inner edge of said ceiling wall at said opening and a lower rim for underlying a bottom surface of said ceiling wall at said opening; and an intumescent ring for surrounding said portion of said fixture so as to be interposed between said metal collar and said portion of said fixture.

In another aspect, there is provided a ceiling fixture system comprising: a ceiling fixture having a portion projecting through an opening in a ceiling wall; a metal collar lining said opening with an upper rim overlying a top surface of said ceiling wall at said opening, a middle section facing an inner edge of said ceiling wall at said opening and a lower rim underlying a bottom surface of said ceiling wall at said opening, wherein said middle section is interposed between said opening and said portion of said fixture.

In another aspect, there is provided an intumescent ring for use with a ceiling fixture, said ceiling fixture having a portion projecting through an opening in a ceiling wall, said intumescent ring for assisting in preventing spread of fire through said opening and comprising: a radially extending flange for overlying a top surface of said ceiling wall at said opening, and a tubular section depending from said radially extending flange, said tubular section for surrounding said portion of said fixture so as to be interposed between said opening and said portion of said fixture.

In a further aspect, there is provided a ceiling fixture system comprising: a ceiling fixture having a portion projecting though an opening in a ceiling wall; a metal collar lining said opening and supported by said ceiling wall with an upper rim of said metal collar overlying a top surface of said ceiling wall at said opening, a middle section of said metal collar facing an inner edge of said ceiling wall at said opening and a lower rim of said metal collar underlying a bottom surface of said ceiling wall at said opening; and an intumescent ring surrounding said portion of said ceiling fixture so as to be interposed between said metal collar and said portion of said ceiling fixture.

Other features and advantages will become apparent from the following description in conjunction with the drawings.

BRIEF DESCRIPTION OF THE DRAWINGS

In the figures which illustrate example embodiments.

DETAILED DESCRIPTION

Figure 1:
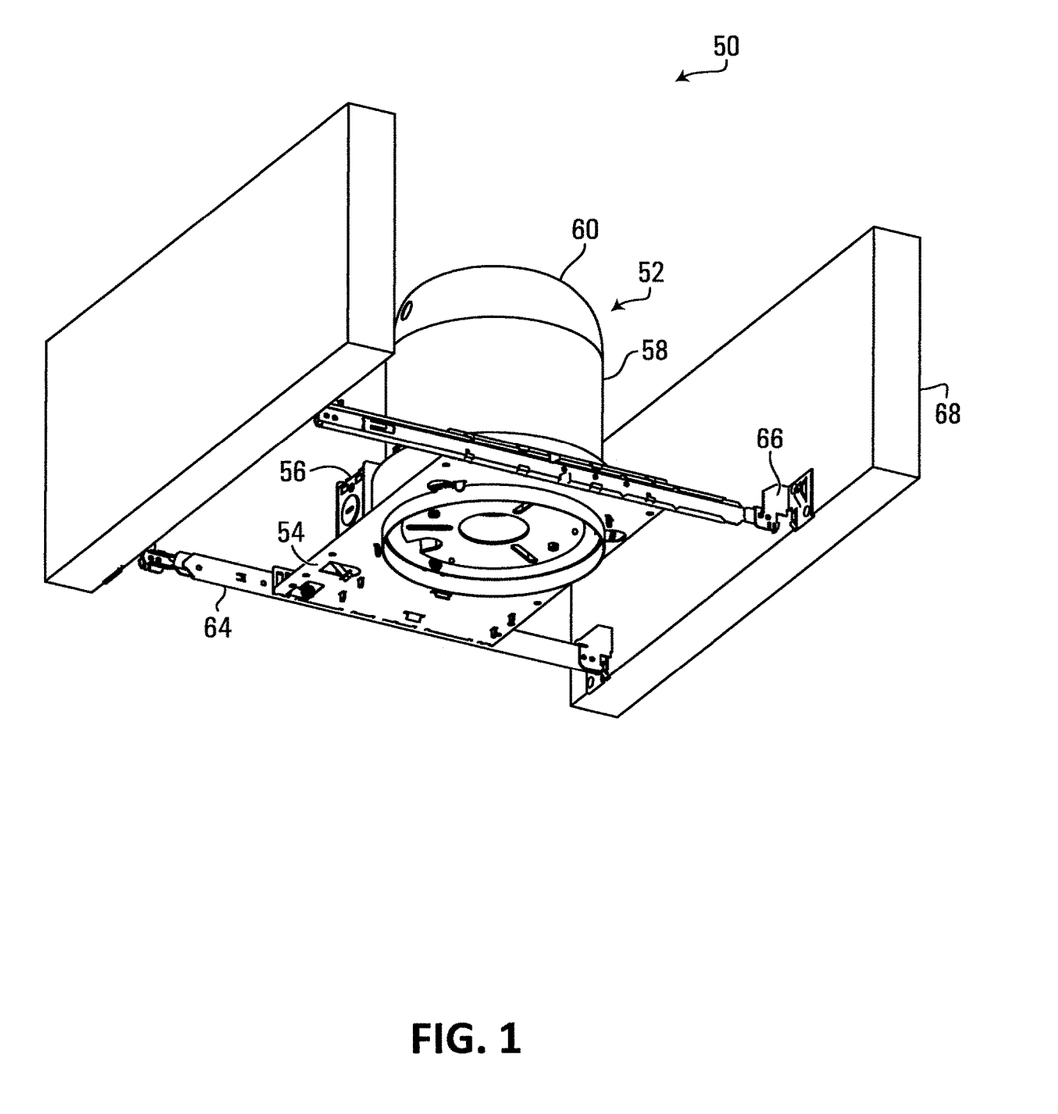
FIG. 1 is a bottom perspective view of a partially installed downlight fixture with a deployed intumescent element.
Figure 2:
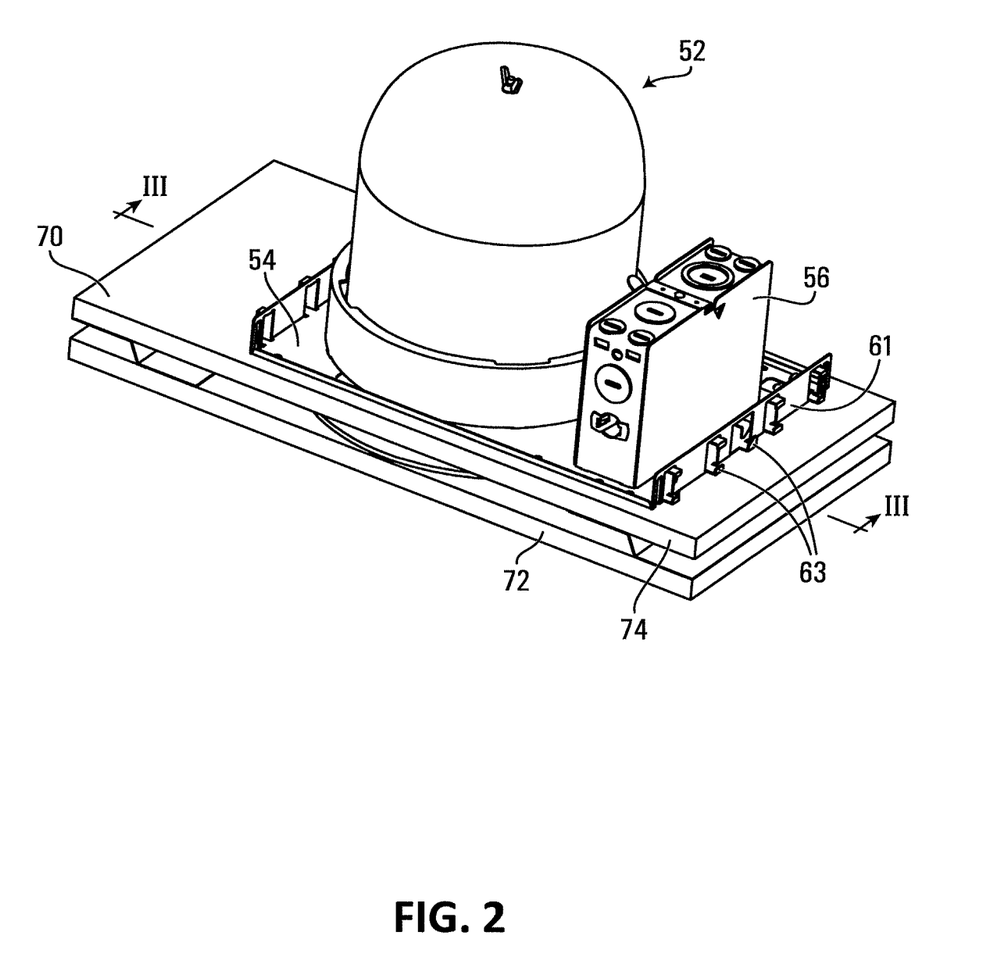
FIG. 2 is a top perspective view of the downlight fixture of FIG. 1 shown fully installed and provisioned with a system in accordance with an embodiment.

Turning to FIGS. 1 and 2, a downlight fixture 50 has a metal light can 52 joined to a rectangular metal base 54 in a conventional fashion so that the light can 52 can be vertically adjusted within the base. The base also supports wiring box 56 which, if the light fixture is used with an electrical gas discharge light, may also include a ballast. The light can 52 has a body 58 shaped as a cylindrical sleeve and an end cap 60 which is joined to the body by rivets 62 (FIG. 3).

The base 54 terminates at each end in an upturned flange 61, with mounts 63 that hold a telescoping arm 64. The telescoping arms terminate in feet 66 which are attached to ceiling joists 68 in order to mount the fixture 50. An upper fire resistant drywall layer 70 is attached to the ceiling joists and a lower fire resistant drywall layer 72 is attached by furring strips 74 to the upper drywall layer. The upper and lower layers 70, 72 have respective openings 78, 79 (FIG. 6) aligned with the light can 52 and a portion of the light can projects through these openings.

Figure 3:
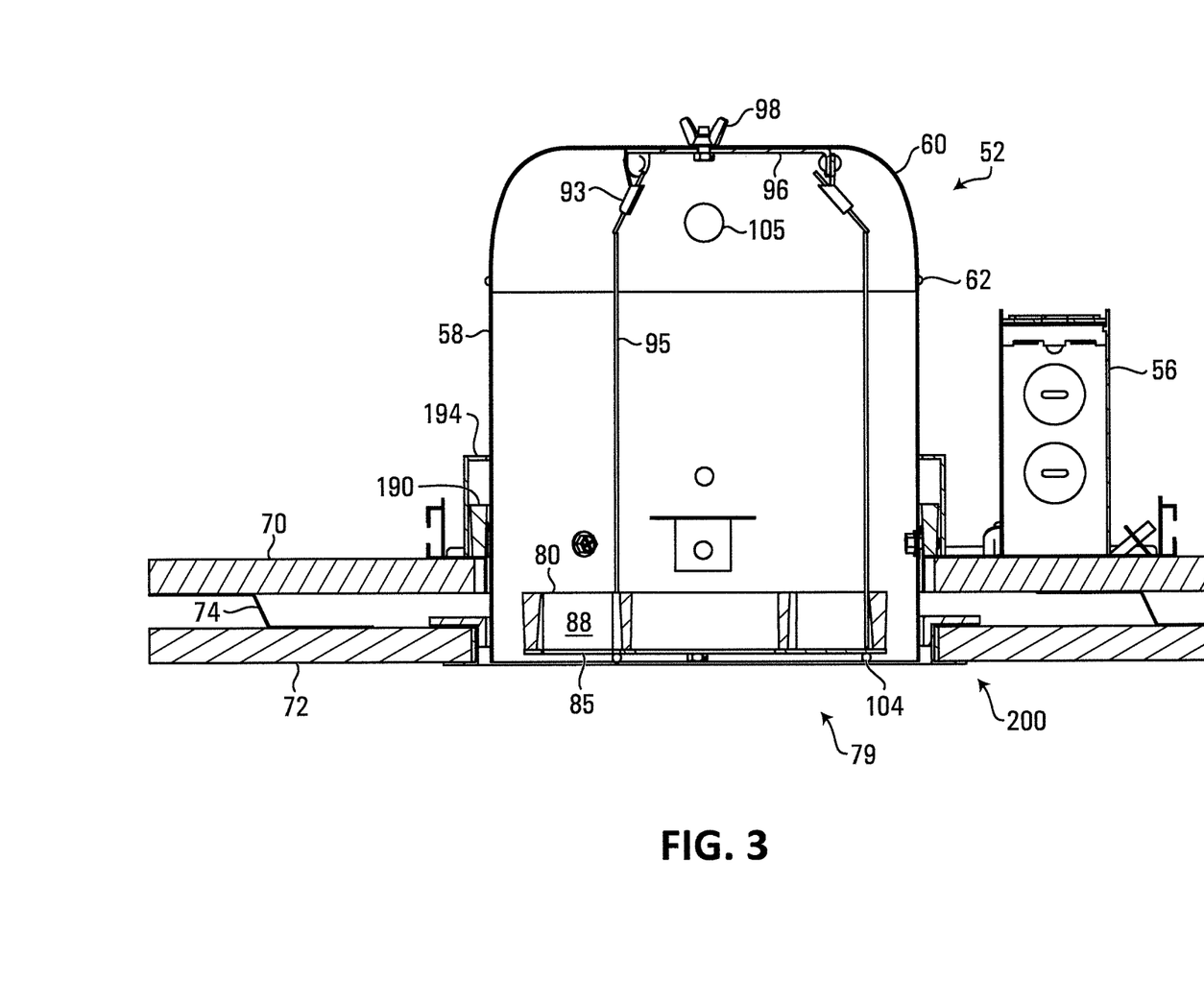
FIG. 3 is cross-sectional view along the lines of FIG. 2.
Figure 4:
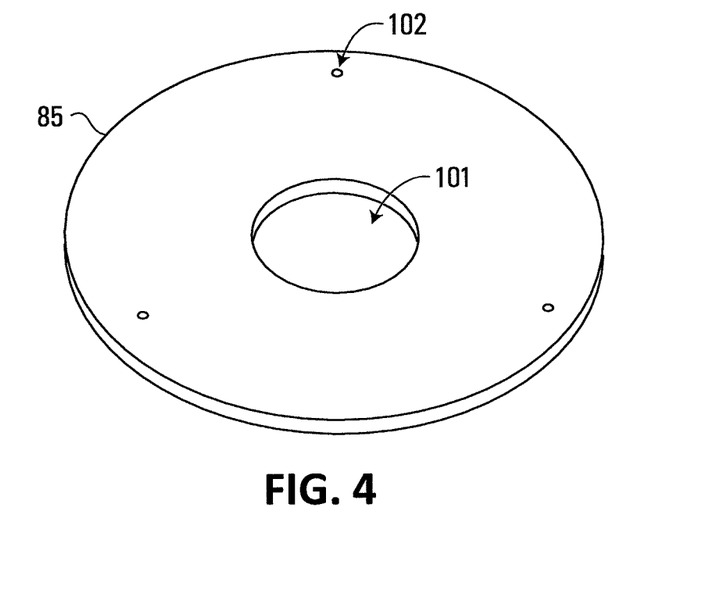
FIG. 4 is a top perspective view of a metal disk of FIG. 3.

With brief reference to FIG. 3, the deployed intumescent element 80 within the light can 52 rests on a metal support plate 85. Element 80 and metal support plate 85 each have a diameter similar to the inside diameter of the light can body 58. The light can cap 60 has an opening 105. Turning to FIG. 4, the metal support plate 85 is an annular disk with a central opening 101 and three peripheral openings 102.

Figure 5:
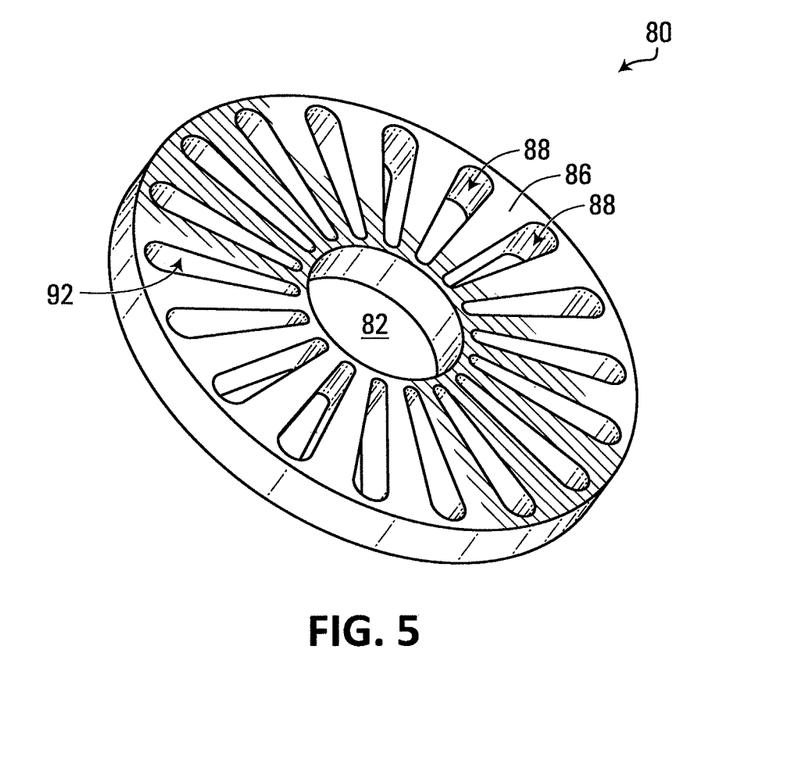
FIG. 5 is a top perspective view of the intumescent element of FIG. 3.

Turning to FIG. 5, the intumescent element is an annular disk with a central opening 82. The disk has a plurality of regularly spaced lands 86 on a face of the disk with a void 88 extending between each pair of lands. The voids are in the nature of radially elongated axial through slots to define a plurality of identical regularly spaced radially extending ribs 92, with a rib between each pair of slots. The bottom surfaces of the ribs are the lands, and the ribs connect to each other at the outer and inner peripheries of the annular disk. Opening 105 in the light can cap along with the central opening 82 of the intumescent element 80 and central opening 101 of the metal support plate 85 allow electrical wiring from the wiring box 56 to reach a light within the light can.

Returning to FIG. 3, an upper end 93 of each of three flexible cables 95 is attached to the underside of the cap 60 of the light can 52 by a web 96 that is in turn joined to the cap with a screw and wing nut assembly 98. Each of the cables passes through one of the voids 88 in intumescent 80 and one of the openings 102 in the support plate 85 and then extends downwardly adjacent the inside wall of the light can, terminating in a bulbous end 104 proximate the base of the light can. The bulbous end of each cable has a larger diameter than the holes 102 through the support plate 85.

An intumescent gasket ring 190 extends about the light can 52 atop the upper drywall layer 70 and is enveloped by a metal sleeve 194.

Figure 6:
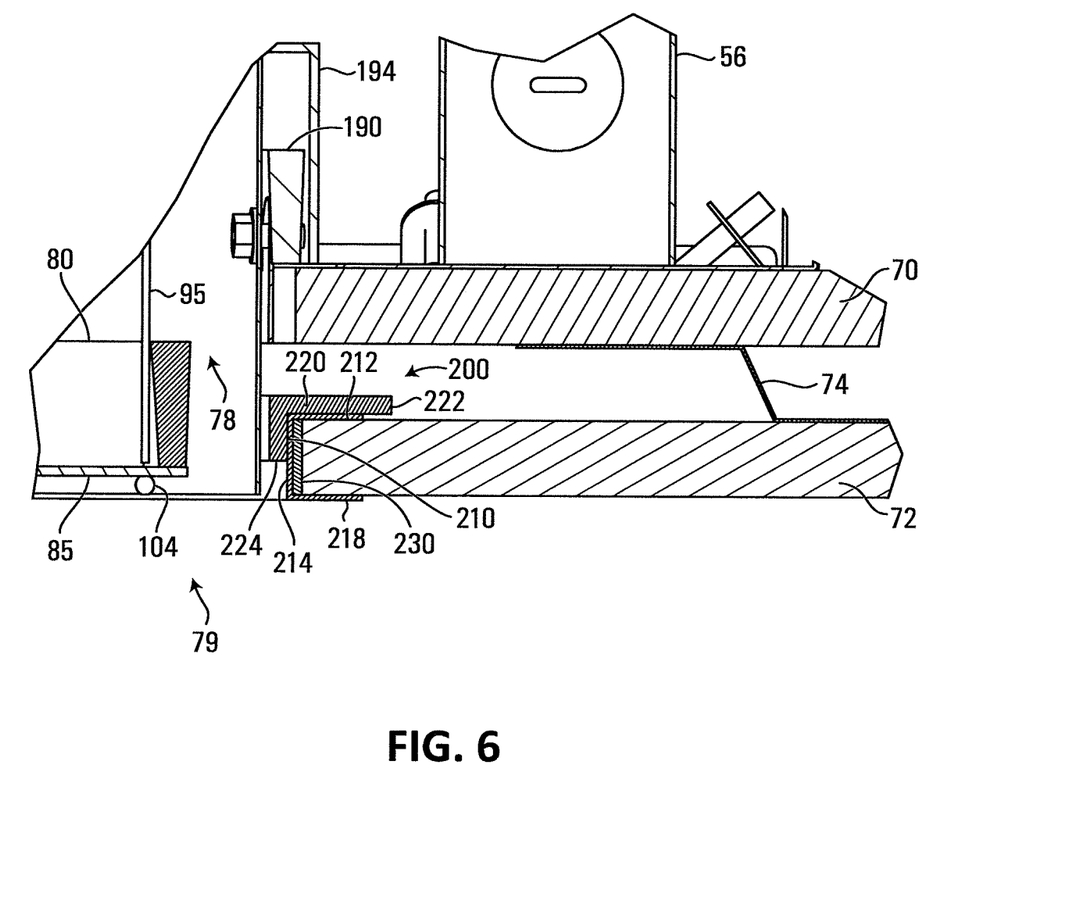
FIG. 6 is an enlarged view within circle D of FIG. 3.

Referencing FIG. 6 along with FIG. 3, a system 200 to assist in preventing the spread of fire through the openings 78, 79 in the drywall layers has a metal collar 210 which is C-shaped in cross-section. The metal collar lines the opening 79 of the lower drywall layer 72. More specifically, the metal collar has an upper rim 212 overlying the top surface of drywall layer 72, a middle section 214 facing the peripheral edge of the opening 79 and a lower rim 218 underlying a bottom surface of drywall layer 72. The surface 216 (FIG. 7B) of the middle section 214 of the metal collar between the upper and lower rims 212, 218 has an intumescent caulking layer 230. The system 200 also has an intumescent ring 220 surrounding the light can 52 and interposed between the metal collar 210 and the light can.

The intumescent element 80, intumescent ring 190, intumescent ring 220 and intumescent caulk 230 are fabricated of an intumescent flame retardant (IFR) that includes one or more IFR polymer composites. Suitable IFR polymer composites may include base polymers, fire retardants, and blowing agents. If the base polymers are inherently fire retardant, such as polyvinyl chloride (PVC), chlorinated polyvinyl chloride (CPVC), halogenated polyethylene Neoprene and phenolic resin, then the fire retardants can be omitted from the composite. Synergists such as antimony oxides and/or zinc borate can be added to improve the fire retardancy of a composite. Char-forming agents can be added to promote charring and increase yield (i.e., final volume after intumescence), and thereby improve the fire retardancy and thermal insulation of a composite. Optionally, other components such as smoke suppressants, pigments, and compatibilizers such as maleic anhydride grafted polyolefin and organofunctional silanes can also be added.

Suitable blowing agents include, but are not limited to, expandable graphites, intumescent hydrated alkali metal silicates, and intumescent hydrated alkali metal silicates with certain amounts of other components such as those described in U.S. Pat. No. 6,645,278 issued Nov. 11, 2003 to Langille et al., the contents of which are incorporated herein by reference. The start expansion temperature (SET) of suitable blowing agents may vary between 120° C. to 350° C., which is well above the normal operating temperature of the downlight fixture. Other suitable blowing agents will also be apparent to those of ordinary skill in the art. Blowing agents in the composite are generally used in amount of about 1 weight percent (wt %) to about 70 wt %.

Suitable fire retardants include, but are not limited to, polymeric halogen, monomeric halogen, alumina trihydrate, magnesium di-hydroxide, mica, talc, calcium carbonate, hydroxycarbonates, phosphorus compounds, red phosphorus, borate compounds, sulfur compounds, nitrogen compounds, silica, and/or various metal oxides. Other suitable fire retardants will also be apparent to those of ordinary skill in the art. The concentration of the fire retardants in a composite generally varies from 5 wt % to 55 wt %.

Suitable base polymers include, but are not limited to, thermoplastics, such as polyethylene, polypropylene, polyamide, ABS, polybutylene terephthalate, polyethylene terephthalate, EVA, thermosetting plastics, and elastomers, such as epoxy, Neoprene, cross-linked polyethylene, silicone, NBR, thermoplastic elastomers, or the blend of above. Other suitable base polymers will be apparent to those of ordinary skill in the art.

A mixture of the different components described above can be compounded into a composite. This composite can in turn be formed into desired geometries by known polymer processing methods such as injection molding, compression molding, transfer molding, or the like. The melting temperature of the base polymers should be lower than the SET of the blowing agents in the composite and higher than the normal operating temperatures expected in the downlight fixture. The temperature between the melting temperature of the base polymers and the SET of the blowing agents is the processing window for the composite. An IFR polymer composite formulated to have an expansion ratio of between 1.2 and 50 is suitable.

Example suitable IFR polymer composites are described in U.S. Pat. No. 6,790,893 issued Sep. 14, 2004 to Nguyen et al., the contents of which are incorporated herein by reference, US2010/0086268 to Reyes, published Apr. 8, 2010, the contents of which are incorporated herein by reference, and US2012/0022201 to Zhvanetskiy et al., published Jan. 26, 2012, the contents of which are incorporated herein by reference.

As will be apparent to those skilled in the art, with these compositions, the intumescent components may be fabricated so as to be rigid or flexible. In this regard, the intumescent ring 220 is fabricated with a thermoplastic or elastomer base polymer so as to be flexible.

Figure 7A:
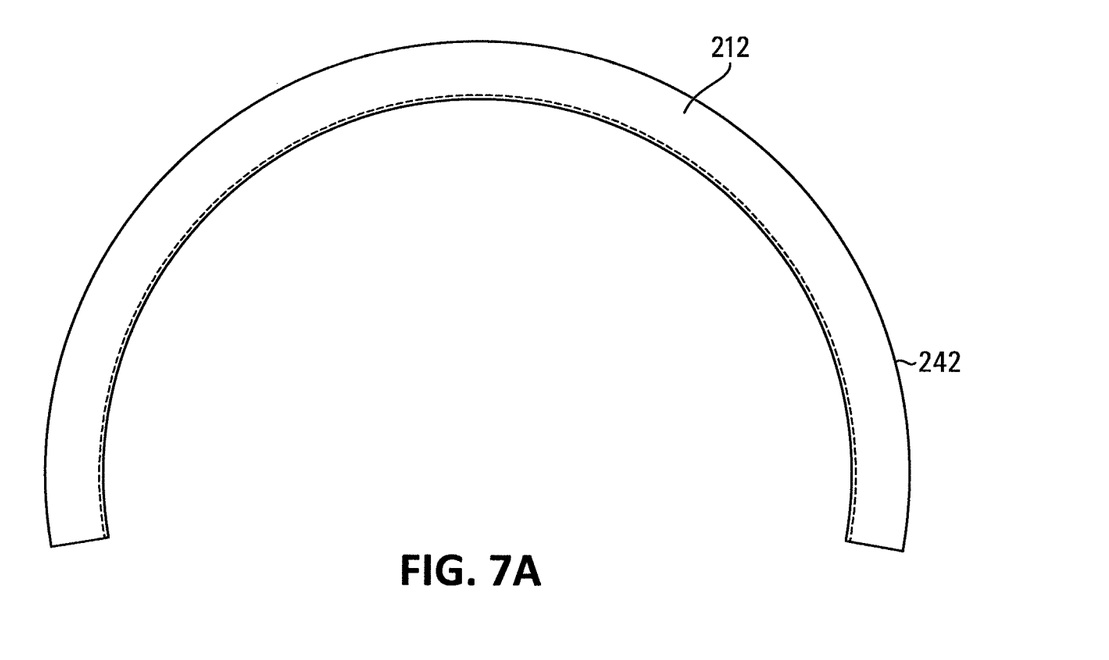
FIG. 7A is a plan view of a part of the system of FIG. 6.
Figure 7B:
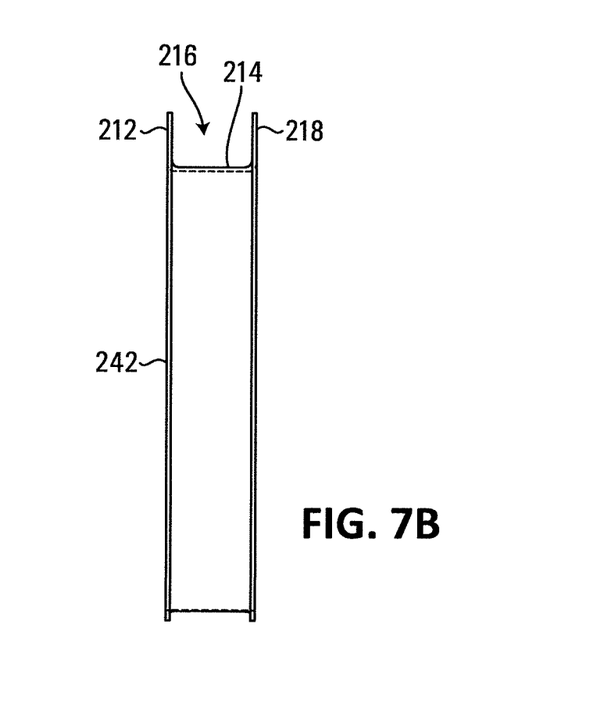
FIG. 7B is a profile view of the part of FIG. 7A.
Figure 8A:
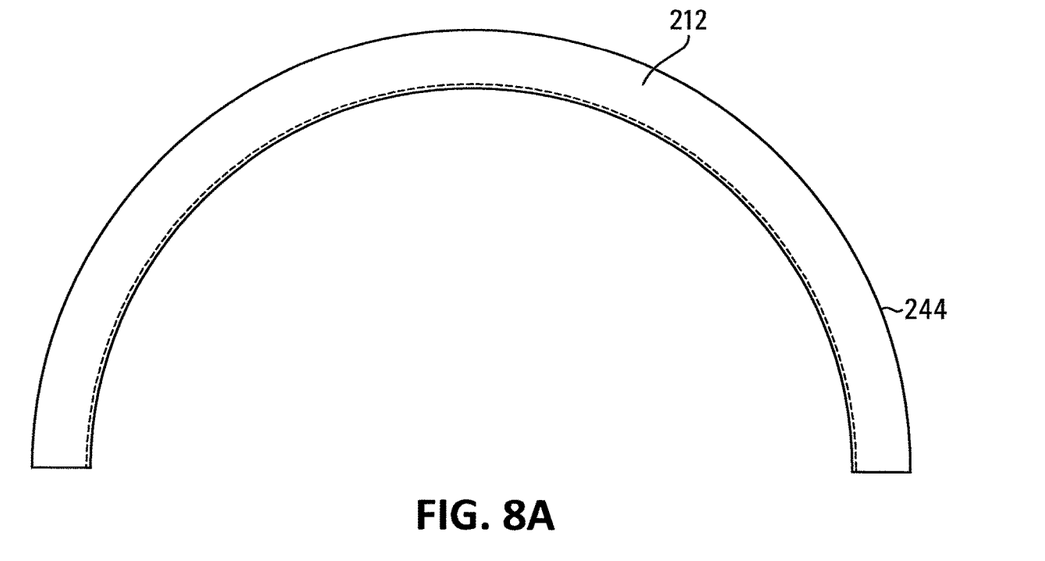
FIG. 8A is a plan view of another part of the system of FIG. 6.
Figure 8B:
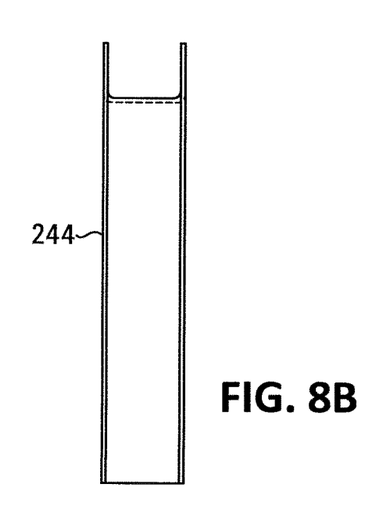
FIG. 8B is a profile view of the part of FIG. 8A.

The metal collar is an assembly of two arcuate parts. Turning to FIGS. 7A and 7B, a first arcuate collar part 242 of the metal collar defines an arc that extends through more than 180°. Specifically, the arc of collar part 242 extends through 200°. Turning to FIGS. 8A and 8B, a second arcuate collar part 244 of the metal collar defines an arc that extends through 180°.

Figure 9:
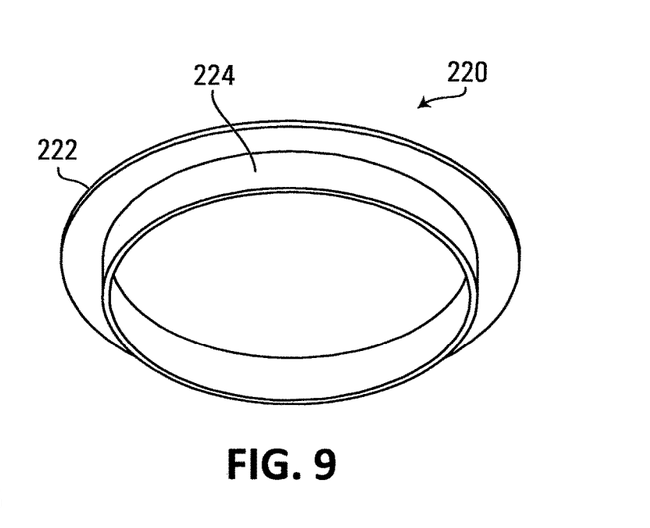
FIG. 9 is a top perspective view of a further part of the system of FIG. 6.

Turning to FIG. 9, the intumescent ring 220 has a radially extending flange 222 and an axially extending tubular section 224 which depends from the inner edge of the flange 222. In consequence, as seen in FIG. 6, the intumescent ring 220 is L-shaped in cross-section with the tubular section 224 interposed between the metal collar and the light can and the flange 222 extending over the upper rim 212 of the metal collar and beyond the outer edge of the metal collar over drywall layer 72.

Figure 10:
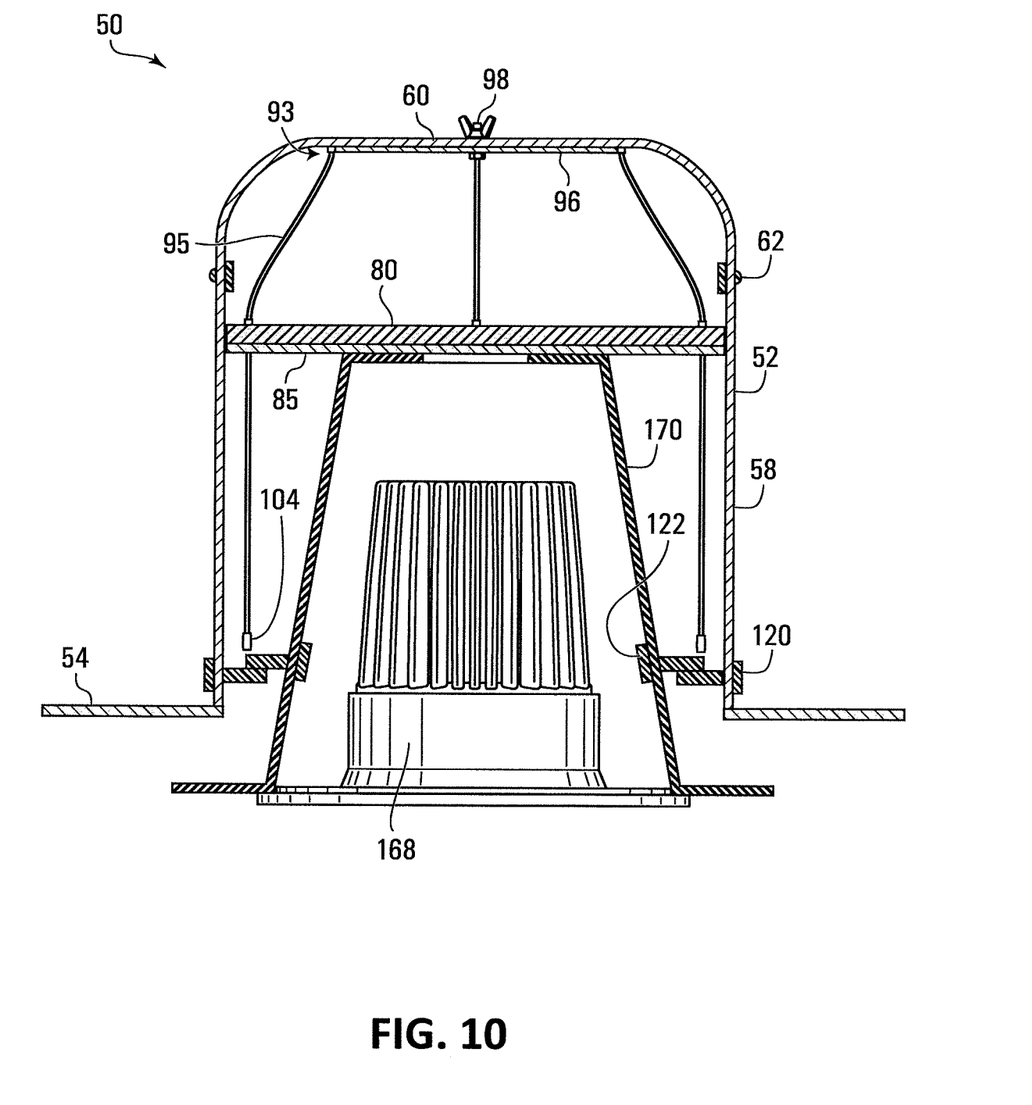
FIG. 10 is a cross-sectional view of the downlight fixture of FIG. 1 with a stowed (non-deployed) intumescent element.

FIG. 10 illustrates the downlight fixture 50 with additional components present to support the intumescent element 80 in a non-deployed, stowed, position. Turning to FIG. 10, downlight fixture 50 has fire sensitive supports, namely plastic T-shaped tabs 120 supported by the light can 52 with tongues projecting inwardly from the light can. Further fire sensitive supports, namely plastic T-shaped tabs 122 supported by a heat sink 170 have tongues projecting outwardly from the heat sink. The tabs 122 of the heat sink rest on the tabs 120 of the light can such that the heat sink 170 is supported within the light can 52. An LED light 168 is mounted within heat sink 170 by any suitable means. Wiring (not shown) extends from the wiring box 56 (FIG. 3) through the light can opening 105 (FIG. 3) to the LED light. The wiring includes a fire sensitive plastic connector (not shown) within the light can. The firestop element 80 and metal support plate 85 are supported on the top of the heat sink 170 such that the heat sink holds element 80 and plate 85 in a stowed position proximate the cap 60 of the light can.

In manufacture of downlight 50, tabs 120 are inserted into the light can 52. The heat sink is then moved into place within the light can and tabs 122 are inserted into the heat sink so that the tongues of tabs 122 overlie the tongues of tabs 120 whereby the heat sink is supported within the light can 52. Next, the end 93 of each cable 95 may be threaded through a peripheral opening 102 (FIG. 4) of plate 85 and a void 88 (FIG. 5) of disk 80 and attached to the underside of the cap 60 of the light can 52. The firestop element 80 with its support plate 85 can then be set in place on the top of the heat sink. The cap 60 of the light can is then brought into place on top of the body 58 of the can, allowing excess cable to move through disk and plate so that the bulbous cable ends hang proximate the base of the light can 52. Cap 60 is then riveted in place by rivets 62.

Figure 11:
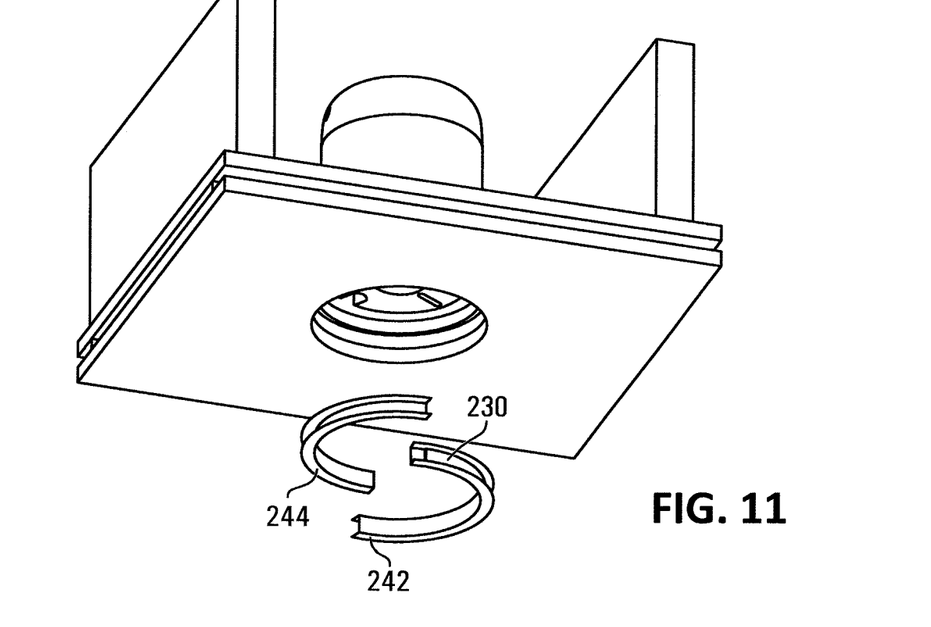
FIGS. 11-14 are bottom perspective views illustrating installation of the system of FIG. 6.

Returning to FIGS. 1 and 2, the assembled downlight fixture may then be installed in a ceiling by extending telescoping arms 64 so that the feet of the arms abut adjacent ceiling joists 68 and then fastening the feet to the joists. Next, circular opening 78 (FIG. 11) is cut into the top drywall layer 70 so that the opening has a slightly larger diameter than that of the body 58 of the light can 52, for example, opening 78 may be ¼" larger in diameter. The top layer of drywall is then attached to the bottom of the ceiling joists in conventional manner with its opening 78 aligned with the light can body. The light can 52 is then pulled downwardly relative to its base 54 through opening 78. Circular hole 79 (FIG. 11) is then cut in the lower layer of drywall 72 so that the opening 79 has a slightly larger diameter than that of the body 58 of the light can 52 and a slightly larger diameter than opening 78, for example ⅝" larger in diameter than the diameter of the light can. The lower layer of drywall is then attached to the upper layer by furring strips, in conventional manner, with opening 79 aligned with the light can body. FIG. 11 illustrates the installation at this stage.

Figure 12:
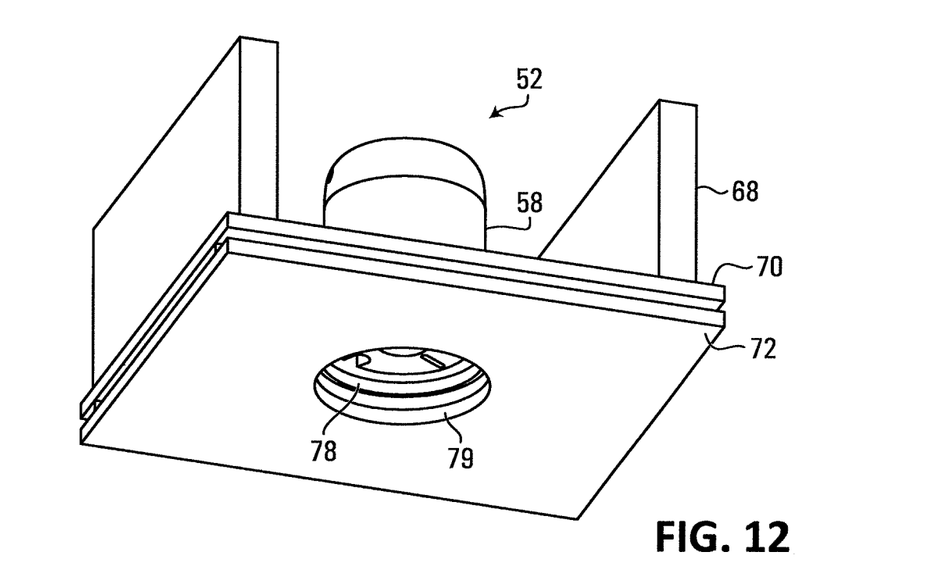
Figure 13:
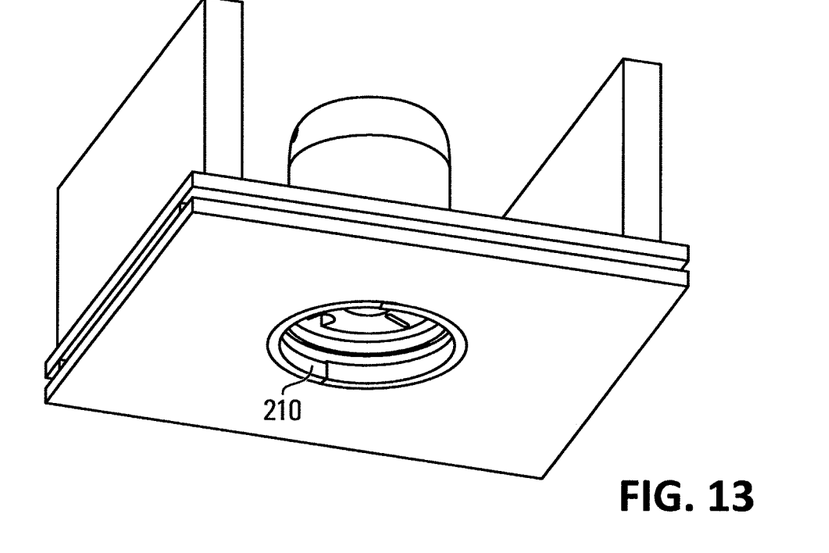
Figure 14:
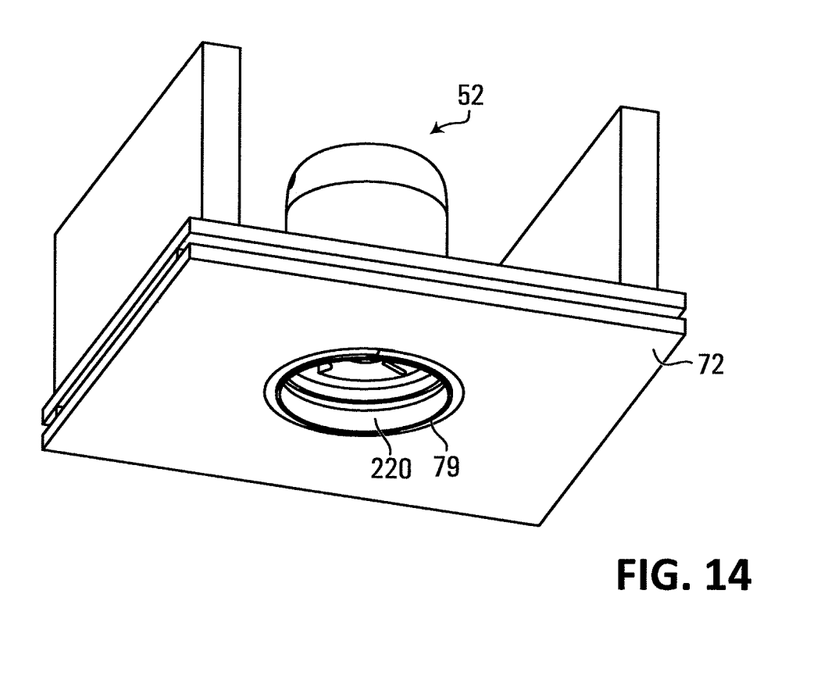

System 200 is now installed. Referring to FIGS. 12 and 13, intumescent caulk 230 is applied to the face 216 (FIG. 7B) of each of the two collar parts 242, 244 of the metal collar. Before the caulk dries, collar part 242 is pressed against the periphery of the opening such that the caulk 230 adheres part 242 to the periphery of the opening and may fill imperfections in this periphery. Collar part 244 follows, being pressed against the periphery of the opening with the two ends of part 244 overlapping the two ends of part 242. FIG. 13 illustrates the installation after placement of the metal collar 210. Next, with reference to FIGS. 6 and 9, the intumescent ring 220 is flexed as required until it is positioned with its radially extending flange 212 extending on top of the upper rim 212 of the metal collar and its depending tubular section 224 extending against the middle section 214 of the metal collar. FIG. 14 illustrates this stage of the installation. Lastly, the light can 52 is pulled down through opening 79 in the lower drywall layer 72 so that the light can extends through opening 79 as shown in FIG. 3.

Figure 15:
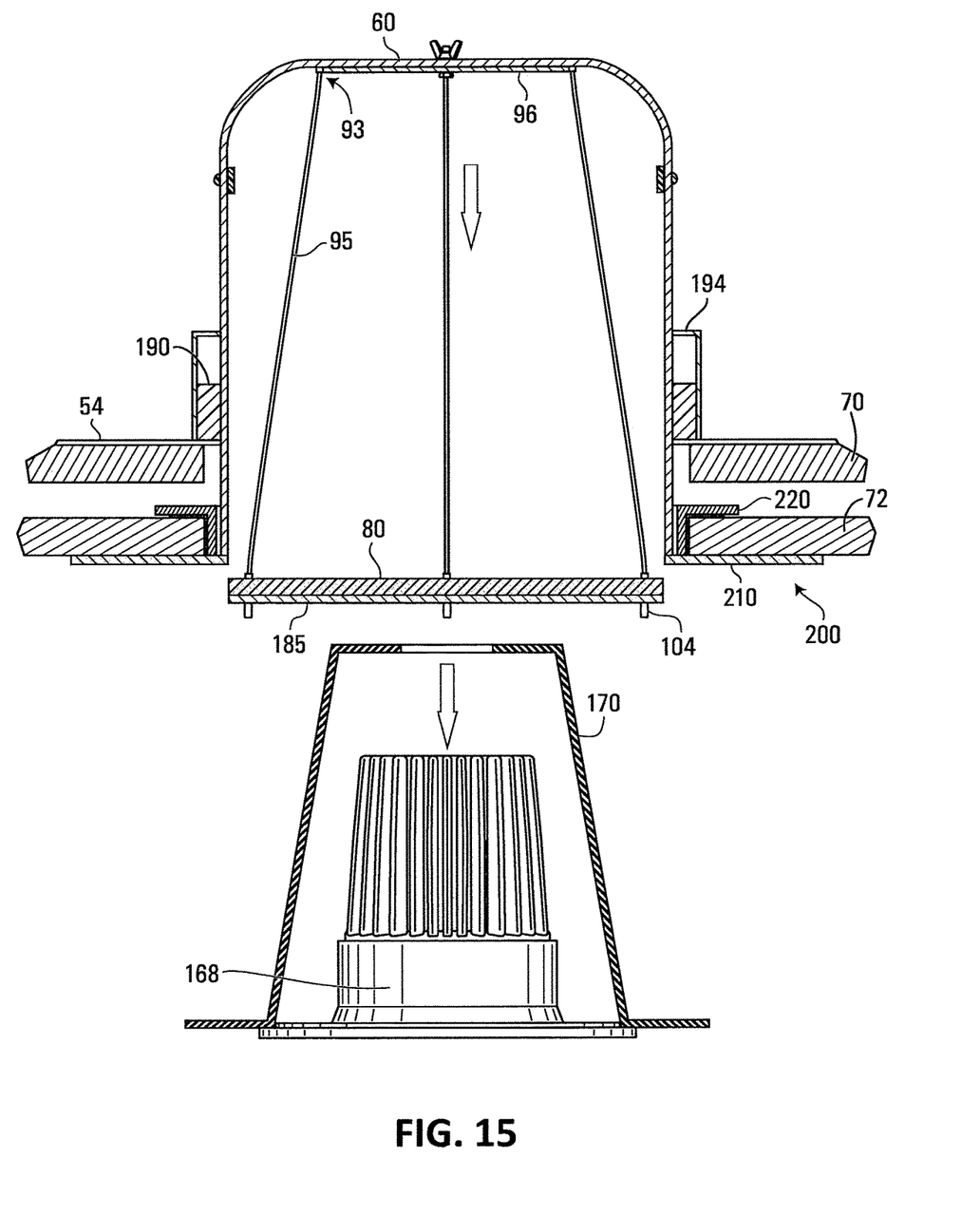
FIG. 15 is a cross-sectional view of the downlight fixture of FIG. 1 with a deployed intumescent element.

In use, referencing FIG. 10, in the event of a fire, tabs 120 and 122 melt or burn off as does the plastic connector in the wiring to the LED light. In consequence, heat sink 170 (with its LED light 168) is no longer supported within the light can 52 and it falls away, as illustrated in FIG. 15. Since the intumescent element 80 with its support plate 85 had rested upon the heat sink, it falls with the heat sink until the support plate 85 abuts the bulbous ends 104 of the cables 95 whereupon the support plate and intumescent disk are arrested by the cables 95. The length of the cables is chosen so that the firestop element when arrested protrudes just below the base of the light can. Thus, the cables act as limiters, limiting the fall of the intumescent element and support plate. With the intumescent element in this deployed position, as this element intumesces, it expands to plug the light can at the bottom. This blocks flames from entering the light can and possibly extending through any openings in the can; it also reduces the heat inside the can.

Additionally, in the event of a fire, the intumescent ring 220 of system 200 intumesces and expands. With this expansion, the tubular section 224 of the intumescent ring 220 pushes against both the light can 52 and the middle section 214 of the metal collar 210. At the same time, the intumescent caulk 230 expands and pushes the middle section 214 of the metal collar toward the tubular section 224 of the intumescent ring 220. The result is that the metal collar is strongly held in place lining the periphery of the opening 79 through drywall layer 72. This may improve the resultant fire protection as it may make the inner periphery of the drywall at the opening less susceptible to failure in a fire, and therefore less susceptible to allowing flames and heat to penetrate past the drywall. Moreover, the flange 222 of the intumescent ring 220 expands into the gap between the upper and lower drywall layers 70, 72, providing further protection against the passage of flames and heat.

The intumescent ring 190 also expands in a fire and helps protect against flames and heat that may pass through opening 79 passing beyond opening 78 in drywall layer 70.

Many modifications are possible. For example, the downlight need not be an LED downlight, but could be any other kind of downlight, such as an incandescent downlight. Also, various modifications may be made to the drop down structure for the intumescent element of the downlight and to the intumescent element itself. A number of such modifications are described in US2019/0011096 to Luo et al. published Jan. 10, 2019, the contents of which are incorporated by reference herein. Additionally, described system 200 may be used with downlights that do not have a drop down intumescent element, but which may have other features to provide a fire barrier through the light can. Some such other downlights are also described in US2019/0011096.

While the system 200 has been described in use with a downlight fixture, it will be apparent that system 200 also has application to provide a fire barrier for openings for other types of ceiling fixtures, such as a ceiling fan and a ceiling air duct. The drywall opening required for a ceiling fixture may have a non-circular configuration, such as a rectangular configuration. In this situation, the metal collar and intumescent ring of system 200 would be modified so as to fit the shape of the drywall opening.

System 200 has been shown in use with an installation having upper and lower drywall layers as two layers of fire resistant drywall provide a greater degree of fire protection. However, other installations may have only a single drywall layer. With a ceiling having a single layer of drywall, intumescent ring 190 and enveloping sleeve 194 would not be used. Moreover, the ceiling wall may not be drywall at all, but may comprise any suitable material.

Other modifications will be apparent to one of skill in the art and, therefore, the invention is defined in the claims.

What is claimed is:

1. A system for use with a ceiling fixture, a portion of which projects though an opening in a ceiling wall, for assisting in preventing spread of fire through said opening, said system comprising:
    an intumescent element supported in said fixture to block an opening of said fixture in event of fire;
    a metal collar for lining said opening, said metal collar having an upper rim for overlying a top surface of said ceiling wall at said opening, a middle section for facing an inner edge of said ceiling wall at said opening and a lower rim for underlying a bottom surface of said ceiling wall at said opening;
    an intumescent ring for surrounding said portion of said fixture so as to be interposed between said metal collar and said portion of said fixture to wedge said housing and metal collar in said opening in event of fire; and
    an intumescent caulk for application to a surface of said middle section of said metal collar between said upper rim and said lower rim.

2. The system of claim 1 wherein said intumescent ring has a radially extending flange for overlying said upper rim of said metal collar.

3. The system of claim 2 wherein said intumescent ring has a tubular section depending from said radially extending flange, said tubular section for said surrounding said portion of said fixture so as to be interposed between said metal collar and said portion of said fixture.

4. The system of claim 3 wherein said metal collar comprises a first section and a second section, said second section fitting with said first section to define said metal collar.

5. The system of claim 4 wherein said first section and said second section are arcuate.

6. The system of claim 5 wherein said first arcuate section defines an arc of greater than 180 degrees.

7. The system of claim 4 wherein said intumescent ring is fabricated of a composition including a thermoplastic or an elastomer such that said ring is flexible.

8. The system of claim 7 further comprising an intumescent disk for extending within said ceiling fixture.

9. A ceiling fixture system comprising:
    a ceiling fixture having a portion projecting through an opening in a ceiling wall and an intumescent element to block an opening of said ceiling fixture in event of fire;
    a metal collar lining said opening with an upper rim overlying a top surface of said ceiling wall at said opening, a middle section facing an inner edge of said ceiling wall at said opening and a lower rim underlying a bottom surface of said ceiling wall at said opening, wherein said middle section is interposed between said opening and said portion of said fixture;
    an intumescent ring interposed between said middle section and said housing, to wedge said housing and metal collar in said opening in event of fire; and
    an intumescent caulk applied to a surface of said middle section of said metal collar between said upper rim and said lower rim.

10. The system of claim 9 wherein said metal collar comprises a first section and a second section, said second section fitting with said first section to define said metal collar.

11. The system of claim 10 wherein said first section and said second section are arcuate.

12. The system of claim 11 wherein said first arcuate section defines an arc of greater than 180 degrees.

13. A ceiling fixture system comprising:
    a ceiling fixture having a portion projecting though an opening in a ceiling wall;
    an intumescent element supported in said ceiling fixture to block an opening of said fixture in event of fire;
    a metal collar lining said opening and supported by said ceiling wall with an upper rim of said metal collar overlying a top surface of said ceiling wall at said opening, a middle section of said metal collar facing an inner edge of said ceiling wall at said opening and a lower rim of said metal collar underlying a bottom surface of said ceiling wall at said opening;
    an intumescent ring surrounding said portion of said ceiling fixture so as to be interposed between said metal collar and said portion of said ceiling fixture, to wedge said housing and metal collar in said opening in event of fire; and
    an intumescent caulk between said middle section of said metal collar and said inner edge of said opening.

14. The system of claim 13 wherein said intumescent ring has a radially extending flange overlying said upper rim of said metal collar.

15. The system of claim 14 wherein said intumescent ring has a tubular section depending from said radially extending flange, said tubular section surrounding said portion of said fixture so as to be interposed between said metal collar and said portion of said fixture.

16. The system of claim 15 wherein said metal collar comprises a first arcuate section and a second section, said second section fitting with said first section to define said metal collar.

17. The system of claim 16 wherein said first arcuate section defines an arc of greater than 180 degrees.

18. The system of claim 14 wherein said intumescent ring is fabricated of a composition including a thermoplastic or elastomer such that said ring is flexible.

19. The system of claim 18 wherein said ceiling fixture is a downlight comprising a light can, said light can further comprising an intumescent disk within said light can.

* * * * *